Dec. 6, 1932.　　　　P. C. GARRISON　　　　1,889,827
SELF FOLDING TOP FOR RUMBLE SEATS
Filed July 8, 1931　　　2 Sheets-Sheet 1
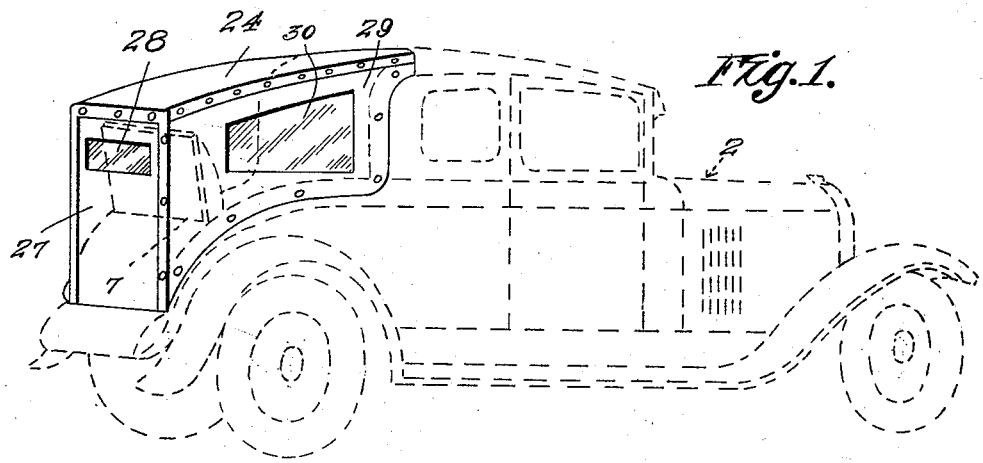
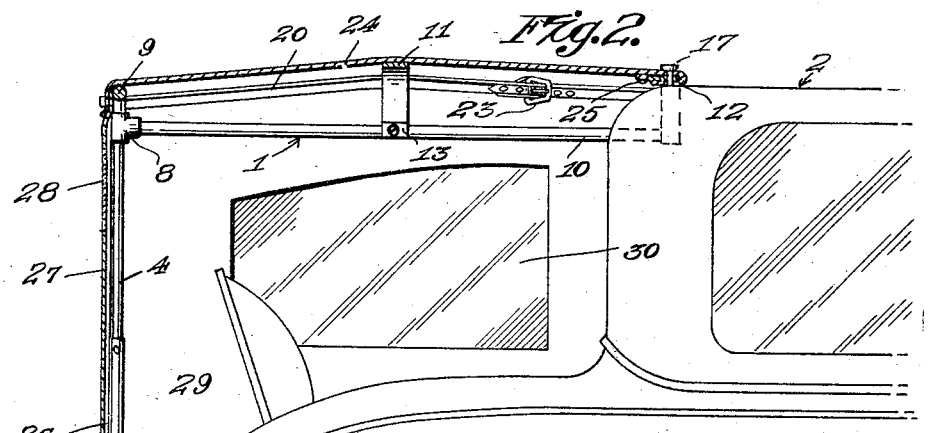
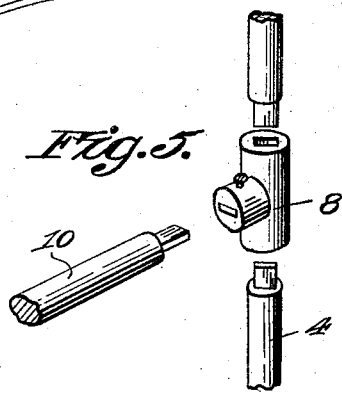
P. C. Garrison,
INVENTOR
BY Victor J. Evans
and Co. ATTORNEY Dec. 6, 1932.  P. C. GARRISON  1,889,827
SELF FOLDING TOP FOR RUMBLE SEATS
Filed July 8, 1931   2 Sheets-Sheet 2
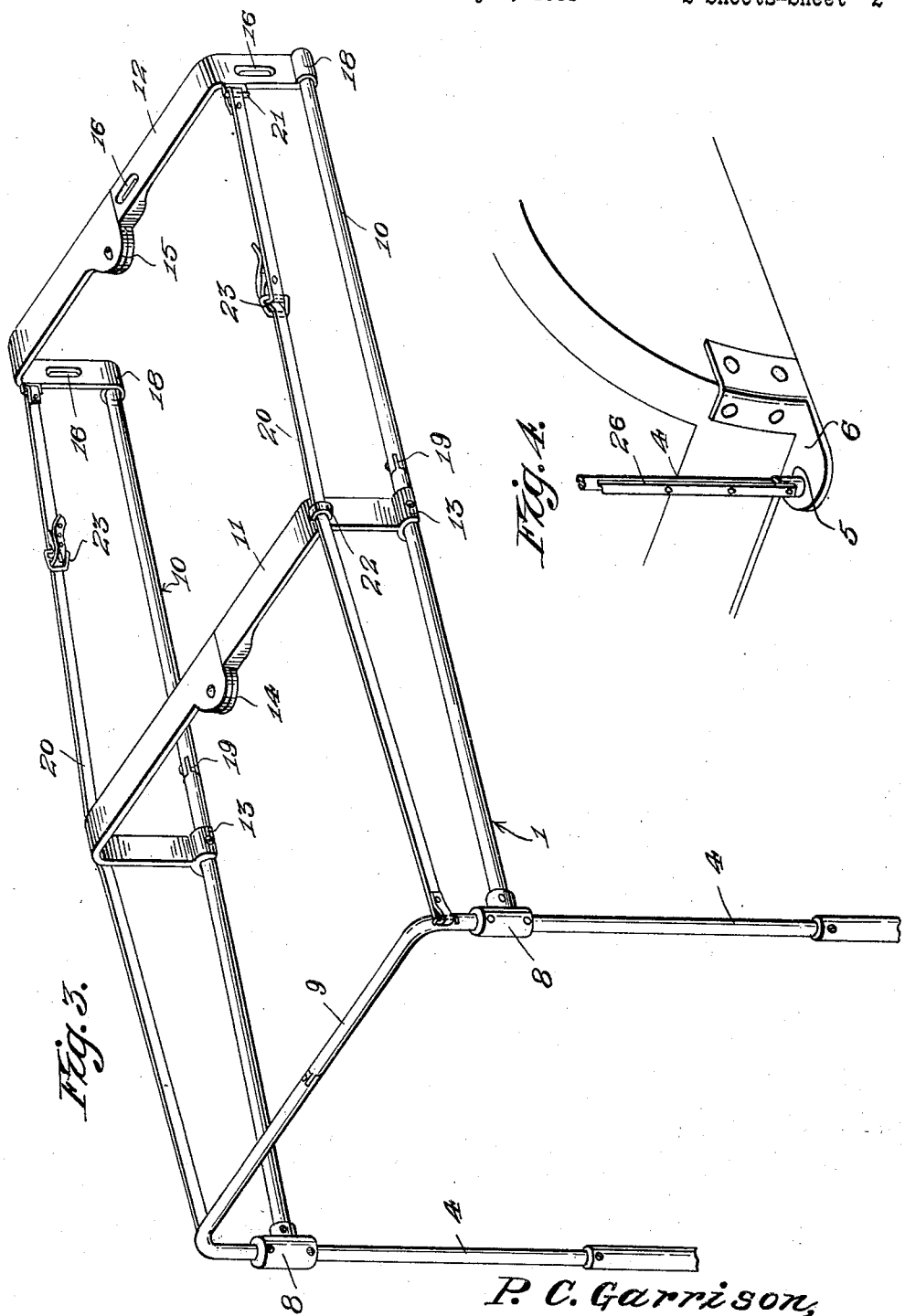

Patented Dec. 6, 1932

1,889,827

UNITED STATES PATENT OFFICE

PATRICK COLUMBUS GARRISON, OF WHEELING, WEST VIRGINIA

SELF-FOLDING TOP FOR RUMBLE SEATS

Application filed July 8, 1931. Serial No. 549,549.

This invention relates to tops for rumble seats of motor vehicles and has for the primary object, the provision of a device of the above stated character which may be easily and quickly applied to a vehicle and which will afford efficient protection against weather elements to the occupants of the rumble seat and when removed from the vehicle it may be folded into a compact device capable of storage in a small space within the vehicle or in other places that may be desired by the user.

Another object of this invention is the provision of a rumble seat top of the above stated character which will be simple, durable and efficient and which may be manufactured and sold at a comparatively low cost.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a perspective view showing a motor vehicle with a folding top for the rumble seat thereof and constructed in accordance with my invention.

Figure 2 is a sectional view illustrating the top applied to a fragmentary portion of a motor vehicle.

Figure 3 is a perspective view illustrating the supporting frame.

Figure 4 is a fragmentary perspective view illustrating the attachment of one of the vertical uprights to the vehicle.

Figure 5 is a fragmentary perspective view illustrating a coupling for connecting the sections of the frame together.

Referring in detail to the drawings, the numeral 1 indicates a supporting structure which may be easily and quickly applied and removed from a motor vehicle 2 and includes a horizontal portion 3 and vertical uprights 4 and each of the latter includes a pair of detachably connected sections with the lower section fitting in a skeeve 5 carried by a bracket 6 on the rear portion of the motor vehicle and which bracket may form a step for aiding a person in entering or exiting from the rumble seat 7 of the vehicle. The uprights 4 at their upper ends are detachably connected to T-couplings 8 and the latter are connected together by a rear bow 9 forming a part of the horizontal portion 3. The rear bow 9 is constructed from a pair of hingedly connected sections, the ends of which are angularly disposed and detachably secured within the couplings 8. Side members 10 are detachably secured to the couplings and are connected together by intermediate and end bows 11 and 12. The intermediate bow 11 is of substantially U-shape having its ends formed to provide arcuately curved attaching feet 13 which are detachably secured to the side members 10. The bow 11 is also constructed of a pair of sections hinged together as shown at 14. The end bow 12 includes a pair of sections hinged together as shown at 15 and the sections are provided with elongated slots 16 to receive fasteners 17 carried by the top of the motor vehicle 2 for the purpose of firmly and detachably securing the bow 12 to the vehicle. The bow 12 is of substantially U shape having its ends bent upon themselves to form barrels 18 which receive the ends of the side members 10. Each of the side members 10 is constructed from a pair of sections hingedly connected as at 19. Adjusting straps 20 are attached to the end bows 9 and 12 as shown at 21 and extend through guide loops 22 on the intermediate bow 11 and the straps are provided with adjusting buckles 23 whereby the tension of the straps may be varied on the bows. The straps are adapted to cooperate with the bows in supporting a top cover 24, the forward edge of which is extended about the bow 12 with the fasteners 17 extending therethrough and secured to itself by detachable fasteners 25.

Attaching straps 26 are suitably secured to the uprights 4 and have the rear edge of the cover 24 secured thereto. A rear curtain 27 is detachably secured to the straps 26 by separable fasteners and has its upper edge disposed under and detachably secured to the rear edge of the cover 24 to provide a leak-proof connection between the cover and the rear curtain. The rear curtain is provided with a window 28 closed by any suitable material.

Side curtains 29 are secured to the side edges of the cover 24, body of the vehicle and the straps 26 by separable fasteners with the upper edges of the curtains disposed under the side edges of the cover. The curtains are preferably secured to the straps 26 by the same fasteners which secure the rear curtain 27 to said straps. With the forward edge of the cover placed about the end bow 12 between the latter and the roof of the vehicle body, a leak-proof connection is established to prevent rain, snow or the like from getting under the cover 24.

The curtains 29 may be provided with windows 30 closed by any suitable material, thus it will be seen that a complete closure has been provided for the rumble seat 7 of the vehicle whereby the occupants will be efficiently protected against weather elements but still have clear vision. It is also to be noted that the devices can be easily and quickly applied to a vehicle and removed therefrom and when removed, the various parts may be separated and folded into a compact device capable of being stored within a limited space within the vehicle or anywhere else that the user may elect.

While I have shown and described the preferred embodiment of my invention, it will be understood that minor changes in construction, combination and arrangement of parts may be made without departing from the spirit and scope of my invention, as claimed.

Having thus described my invention, what I claim is:

A top for rumble seats of vehicles comprising brackets secured to the rear end of a vehicle, adjustable vertically disposed supporting members detachably secured to the vehicle by the brackets, horizontal members connected to the supporting members and extending over the rumble seat of the vehicle to the top thereof and each including pivotally connected sections, transversely arranged substantially U-shaped elements secured to the horizontal members and one of the members engaging the top of the vehicle, said elements each including hinged sections, adjustable straps secured to the bow elements, and a cover supported by the bow elements and the straps.

In testimony whereof I affix my signature.

PATRICK COLUMBUS GARRISON.